July 26, 1938.  O. H. HACKER ET AL  2,125,163
METHOD OF OPERATION FOR MOTOR DRIVEN VEHICLES WITH TURBO-TRANSMISSIONS
Filed July 9, 1934
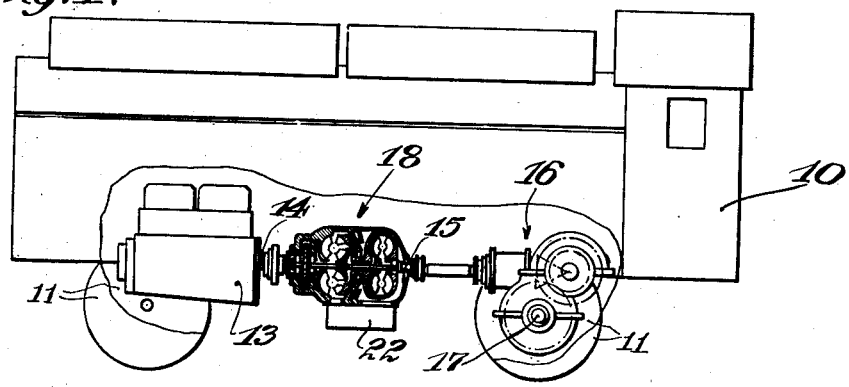
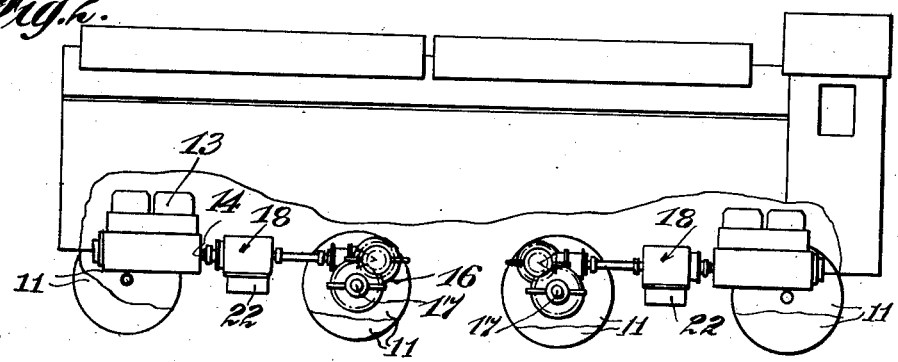
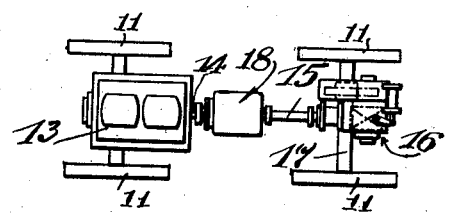
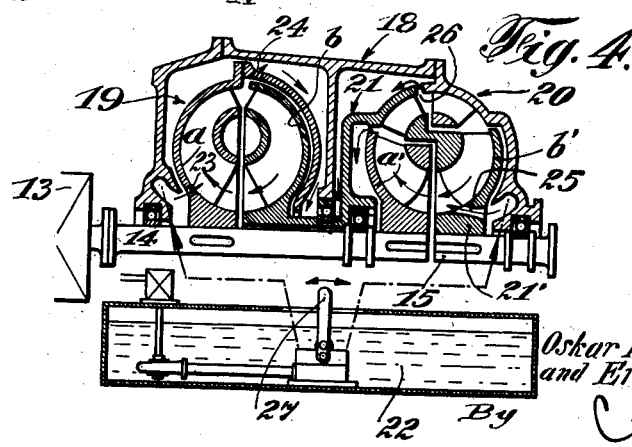
INVENTORS
Oskar H. Hacker
and Ernst Seibold
By C. P. Goepel
their ATTORNEY Patented July 26, 1938

2,125,163

UNITED STATES PATENT OFFICE 2,125,163

METHOD OF OPERATION FOR MOTOR DRIVEN VEHICLES WITH TURBO-TRANSMISSIONS

Oskar H. Hacker, Wiener-Neustadt, Austria, and Ernst Seibold, Heidenheim-on-the-Brenz, Germany, assignors to J. M. Voith, Heidenheim-on-the-Brenz, Germany, a copartnership composed of Walther Voith, Hermann Voith, and Hanns Voith.

Application July 9, 1934, Serial No. 734,399½
In Germany July 10, 1933

1 Claim. (Cl. 60—97)

The invention relates to a method of operating vehicles with forward and reverse drive equipped with hydrodynamic turbo-transmissions. These hydrodynamic transmissions are characterized by the fact, that when they are engaged, i. e. when their working liquid circuit is filled the motor is mechanically independent of the drive element connected to drive-axle or drive wheels. For instance it is possible to let such a vehicle roll backwards while the motor is running in forward direction, for this purpose it is only necessary to reduce the motor speed to such a speed that the torque developed by the hydrodynamic transmission is not sufficient to overcome the force moving the vehicle backwards. It is furthermore possible to manoeuvre with the hydrodynamic transmission in such a way by increasing the motor speed that the torque increases steadily so that the vehicle is brought smoothly and without any shock to a motion in forward direction.

A vehicle equipped with a hydrodynamic transmission when running up a grade can, therefore, be stopped by only reducing the motor speed accordingly and can be kept stopped without applying the brakes by adjusting the motor speed so that the vehicle will be maintained in this state for any length of time and it can be started again by simply accelerating the motor speed. When running downhill it is possible to check the speed of the vehicle without any aid of the brakes by simply engaging the reverse gear. Then the secondary part of the hydrodynamic transmission is driven through the reversing gear from the drive wheels in reversed direction, the primary part is driven forward by the engine and the speed of the latter is so adjusted that the desired maximum speed of the vehicle is not exceeded.

Our invention is illustrated by way of example in the accompanying drawing, wherein similar characters of reference indicate corresponding parts throughout the several views, and in which:

Figure 1 is a broken and part sectional side elevational view, more or less diagrammatical in character, showing a vehicle embodying our invention;

Fig. 2 is a similar view showing a vehicle equipped with two operating units, each consisting of a motor, a hydrodynamic turbo transmission and reversing gear;

Fig. 3 is a top plan view of one unit; and

Fig. 4 is a broken elevation and section of the hydrodynamic turbo transmission.

The invention relates to the equipment of a vehicle and to the method of operation of the same whereby the characteristics, mentioned before, are made use of.

With more particular reference to the accompanying drawing, and first to Figs. 1 and 3, our invention for purposes of illustration is shown in connection with a vehicle 10, having wheels 11. The source of power may consist of any suitable engine or motor 13 arranged with its shaft 14 extending longitudinally of the vehicle and co-axial with a separate shaft 15 which is to be driven.

Associated with the shaft 15 for operation thereby is a reversing gear transmission means which is denoted as a whole by the reference numeral 16. This reversing gear is suitably geared with the vehicle driving axle 17 to cause movement or travel of the vehicle, either in a forward or backward direction, accordingly as the reversing gear itself is shifted or primed for taking power from the driven shaft 15 and transmitting such power to the axle 17 with a forward driving effect or a backward driving effect. The specific reversing gear transmission means is not important, for many different specific clutch mechanisms are known or can readily be devised for converting the power of the driven shaft 15 into forward or backward propulsion of the vehicle.

The hydrodynamic transmission is indicated generally at 18 and is represented as comprising a flow coupling 19 in combination with a torque changer 20. The primary wheels $a$ and $a'$ of the coupling and torque changer respectively are attached to the driving shaft 14; and the secondary wheels $b$ and $b'$ of these respective parts are connected together to provide a common rotary element 21 one end 21' of which is attached to the driven shaft 15.

Working liquid is passed under pressure from tank 22 into the chamber of primary wheel $a$ through suitable passages as 23. Liquid is discharged from the chamber of this wheel through an outlet opening 24.

To the chamber in the torque changer, liquid is admitted through an opening 25. The outlet for the discharge of liquid from the torque changer chamber is indicated at 26.

By suitable means which may consist of an operating valve 27, liquid may be shut off from the torque changer 20 at the same time liquid is permitted to enter the coupling 19, and these operations result in emptying the torque changer and filling the coupling whereby slightly to decrease torque transmission by the torque changer and to slightly increase torque transmission by the coupling. There is of course continuous discharge from and flow into the torque changer or the coupling whichever is in operation.

When either the coupling 19 or the torque changer 20 is engaged, that is to say, when their respective working circuits are filled, the motor is mechanically independent of the driven shaft 15 which is connected through the reversing gear apparatus with the driving axle 17 of the vehicle. Due to this arrangement the motor may be in operation for driving the vehicle in a forward direction while the vehicle itself may be permitted to travel in the opposite or backward direction. To accomplish this result the motor speed must be reduced to such extent that the torque developed by the hydrodynamic transmission will be insufficient to overcome the opposite torque developed by the force which causes or tends to cause backward travel of the vehicle. Another advantage of this arrangement is that the travel of the vehicle may be changed from a backward direction to a forward direction in an easy smooth manner and without shock or sudden jolt. This maneuver can be accomplished by increasing the motor speed to an extent sufficient to overcome the force that causes or tends to cause backward travel of the vehicle.

With this hydrodynamic transmission, the vehicle may be stopped and maintained on a grade without applying the brakes, by properly adjusting the motor speed to the backward rolling force. The vehicle can again be started up-grade by accelerating the motor speed. It will be realized that while the vehicle is running downgrade, its speed may be checked without the aid of brakes, simply by shifting the reversing gear into reverse. Through this operation the secondary part of the hydrodynamic transmission will be driven through the reversing gear from the driving axle in reversed direction, while the primary part is driven forward by the motor, the speed of which is adjusted to permit movement of the vehicle at the rate desired.

If a vehicle is equipped with two engines and two hydrodynamic turbo transmissions which by means of reversing gear can be coupled to the drive wheels in order to obtain the forward and backward motion the method of operation on a long downhill grade will be as follows:

One engine is set for driving in forward direction, the other for backward direction. When one engine is used for the forward direction, the other engine which is used for backward direction idles so as to be constantly available for braking operation, although if desired this other engine may be stopped. With the forward engine the vehicle is brought to the desired speed, then this engine is stopped or set to idling while instead of braking the speed is controlled by accelerating or decelerating the second engine, as the case may be. If the grade is interrupted by plane or uphill parts, where a speed loss would occur, the first engine can be taken for accelerating again.

This method of operation has the great advantage that the full engine power is available for braking purposes and that braking is at the same time very intense but smooth and that no wear of mechanical parts but only heating of the working liquid of the turbo transmission occurs. The thus generated heat can easily be dissipated by coolers of known type.

If reversing mechanisms engageable during operation are provided, it is possible to also use all engines either for driving or braking.

We claim:

The method of controlling the speed of travel of a land vehicle having at least two pairs of wheels which comprises, applying an elastic and yielding torque to one pair of wheels tending to drive the vehicle in one direction, applying an elastic and yielding torque to the other pair of wheels tending to drive the vehicle in the opposite direction, and controlling the extent of the two elastic and yielding opposing torques whereby the vehicle may be caused to accelerate and decelerate in either direction of motion.

OSKAR H. HACKER.
ERNST SEIBOLD.